United States Patent Office 3,164,208
Patented Jan. 5, 1965

3,164,208
INCREASING PERMEABILITY OF SUBSURFACE
FORMATIONS
William J. McGuire, Jr., College Station, and Loyd R. Kern, Irving, Tex., assignors to The Atlantic Refining Company, Philadelphia, Pa., a corporation of Pennsylvania
No Drawing. Filed Feb. 13, 1961, Ser. No. 88,635
13 Claims. (Cl. 166—42)

The present invention relates to the treatment of subsurface earth formations to increase their permeability to fluids. More particularly, the present invention relates to the treatment of subsurface earth formations to increase their permeability to fluids by providing highly permeable fractures through selected formations forming the walls of a well bore penetrating the earth.

The present application is a continuation-in-part of application, Serial No. 659,718, filed May 16, 1957, by William J. McGuire, Jr. and Loyd R. Kern and entitled "Increasing Permeability of Subsurface Formations."

In the art of increasing the permeability to fluids of subsurface formations, it is well known that improved productivity of oil and gas from hydrocarbon-bearing formations and improved injectivity of fluids into earth formations can be obtained by creating or enlarging flow channels or fractures extending from the well bore into such preselected formations. Such fractures may be created or existing fractures may be enlarged by the application of high pressures to fluids disposed in the well bore adjacent the formation to be fractured. In some cases, the mere opening of one or more fractures will result in some increase in the over-all permeability of the formation. However, in order to obtain the greatest advantage from the creation of subsurface fractures, it is also necessary to deposit a solid particle-form propping agent in the fracture to hold the fracture open and form a flow channel having a permeability to fluids greater than that of the formation itself.

Conventional fracturing operations are usually carried out as a two or three step operation. The first step involves pumping into the well bore adjacent the formation to be fractured a fluid such as crude oil, water, diesel oil, kerosene, and the like, while applying a pressure sufficient to crack the formation and thereby form a fracture or to extend existing fractures. The fluid utilized to create the fracture or to enlarge an existing fracture is in most cases an untreated fluid. However, this fluid may be what is termed a nonpenetrating fluid which has been treated to reduce leakoff of the fluid through the pores of the formation and thereby permit the use of lower pressures or lower pump rates. Following the creation of the fracture, the breakdown fluid is generally followed immediately by a carrier fluid containing a solid particle-form propping agent, which fluid is pumped in at substantially the same pressure as the pressure employed to pump in the breakdown fluid. The carrier fluid is generally a gelled or a viscified fluid capable of suspending the solid propping agents for a reasonable length of time. Ordinarily, the suspending power of the carrier fluid is just sufficient to suspend the propping agent for a time sufficient to carry the propping agent out of the well bore and into the fracture. In addition to the reduction of fluid leakoff by viscifying the carrier fluid, further reduction of the filtration of the carrier through the walls of the fracture may be accomplished by the inclusion of leakoff control agents to the carrier.

The propping agents heretofore employed have almost universally consisted of generally spherical sand capable of passing through a 20-mesh or smaller screen of the U.S. Sieve Series. For the most part, the sands employed are a mixture ranging from 20- to 40-mesh size, with smaller amounts of 40- to 60-mesh material being utilized under special circumstances and in rather rare instances 10- to 20-mesh.

Finally, following the deposition of the propping agent in the fracture, a third fluid is pumped into the well to push all propping agent out of the well bore and into the fracture and thus assure the deposition of the last injected volume of the propping agent in the fracture rather than in the bottom of the well. This last fluid is generally a viscous fluid but may be either viscous or nonviscous and is generally referred to as an overflushing fluid. Depending upon the nature of the fluids employed in the fracture treatment, production of fluids from the formation may also be preceded by the introduction of a solvent or diluent for the fracturing fluids. However, in most cases, the formation fluids themselves may serve to dilute and flush out the fracturing fluids.

The above-described conventional materials and techniques result in substantial increases in the permeability of the formation treated. However, in many cases, the natural permeability of a formation is comparatively high, and conventional fracturing operations are incapable of providing any real increases in productivity. In addition, many oil and gas producing formations have already been fractured at least once. Although the first or original fracture treatment usually results in a substantial increase in productivity, this productivity gradually declines to a point where additional stimulation of production is necessary. In such cases, the formation is often refractured but a second or subsequent fracture job obviously will not result in the same percentage increase in productivity as the first treatment. It has been found that the limiting factors which prevent the obtention of maximum productivity increases both in original and refracture operations stem from both the techniques employed and the materials utilized. In conventional fracturing operations, the sand utilized as a propping agent settles in the fracture in a solid, multilayer pack. This is due in part to the fact that the fracture is generally much wider than the diameter of the sand grains. Also the fluid employed as a carrier for the sand leaks off through the walls of the fracture thus concentrating the sand in the carrier, which leakoff increases as the distance from the well bore increases. Finally, the suspending power of the carrier is often ineffective to suspend the sand until the fracture closes to hold it in place and the sand settles out in the bottom of the fracture. Accordingly, a solid pack of propping agent of comparatively low permeability builds up either from the remote end of the fracture toward the well bore or from the bottom of the fracture toward the top. Furthermore, the practice of employing an overflush during a fracture treatment also tends to pack the sand in a solid multi-layer mass in the fracture.

Accordingly, it is an object of the present invention to provide an improved method for increasing the permeability to fluids of subsurface earth formations.

Another object of the present invention is to provide an improved method for forming fractures in subsurface earth formations having substantially increased capacity to fluid flow.

Still another object of the present invention is to provide an improved method for depositing propping agents in preformed subsurface formation fractures.

Other and further objects of the present invention will be apparent from the following detailed description.

In accordance with the present invention, it has been found that substantially increased permeability to fluid flow can be attained in subsurface formation fracturing operations by depositing in such fractures a single layer or less than a single layer of solid, particle-form propping agents of preselected size and strength. Specifically, the present invention provides a method whereby a subsurface formation fracture may be propped with particles of preselected size and strength such that the individual particles are sparsely distributed in the fracture and thus do not impede fluid flow through the fracture and the particles hold the fracture open wide enough that it is not easily plugged with extraneous matter and the narrowness of the fracture does not seriously impede fluid flow.

There are several inter-related criteria which are necessary in order to carry out the method set forth above. First, the solid propping agent should be sufficiently large so that the fracture will be held open a sufficient distance to permit substantially unimpeded fluid flow therethrough. Second, the fluid employed to carry the propping agent into the fracture must suspend the propping agent particles so that they do not settle prior to the closing of the fracture walls against the particles or settle very slowly. Third, the concentration of the particles deposited in the fracture must not be so low that the pressure applied by the walls of the fracture will exceed the strength limits of the propping particles and crush them into small fragments and the particles must not be deposited in such a high concentration that a relatively impermeable solid pack of propping agent will result and thus interfere with fluid flow through the fracture. Finally, an overflush should not be used following the deposition of the propping particles since such overflush will wash the particles away from the well bore where they are needed most and tend to pack the particles in a solid pack.

There are a number of techniques which may be employed to deposit a single layer or less than a single layer of large-sized propping agents in a fracture in accordance with the present invention. Several of these techniques are discussed below.

The first and preferred technique for depositing a sparse population of propping agent in a fracture involves a four-step procedure. First a penetrating fluid, such as unmodified crude oil, water, kerosene, diesel oil or the like, is injected into the well in order to establish the pump rate possible for the equipment available and the pressure limitations of the equipment. Next, a large volume of a nonpenetrating fluid which has been treated to control leakoff is injected to lengthen the initial fracture and seal the walls of the fracture against further leakoff of fluids through the fracture walls. This fluid is preferably a low viscosity fluid and has added thereto formation plugging or leakoff control additives. After extending the fracture and treating the walls of the fracture to reduce leakoff, the fracture is widened in order to permit the introduction of large-sized particles. This is accomplished by injecting a high viscosity or high gel strength fluid. Finally, a carrier fluid containing solid particle-form propping agents of preselected size and character is injected in order to deposit such propping agent in the fracture in a single layer or less than a single layer. As previously indicated, this fluid should be capable of suspending the selected propping agent for a length of time sufficient to hold the particles in suspension until the walls of the fracture close on the particles and hold them in place in their intended sparse distribution. An overflush should not be employed following the injection of the carrier fluid containing the sparsely distributed propping agent. Such overflushing will not only flush the particles away from the portion of the fracture adjacent the well bore where it is needed most but will tend to pack the particles in the most remote regions of the fracture. As a matter of fact, it is preferred that an underflush of a few barrels be used in order to reduce the chance of accidental overflush. In other words, a few barrels of carrier containing propping agent are permitted to remain in the well bore after pumping of the carrier ceases. This volume of underflush is then removed from the well or circulated back to the surface after the treatment is completed.

It has previously been indicated that the primary purpose of the present invention is to deposit propping agent in the fracture in a single layer or less than a single layer, or in other words to accomplish a sparse population of propping agent in the fracture. By following the technique set forth above, the concentration of propping agent in the fracture will be substantially the same as the concentration of the propping agent in the carrier as it is injected into the well at the wellhead. This is true since the fracture has been treated to substantially reduce leakoff and the carrier will not leakoff to any appreciable extent and thus concentrate the particles in the fracture.

One of the primary features of the present invention is the utilization of solid particle-form propping agents much larger than those heretofore employed. It has been found that if such large particles are sparsely distributed in the fracture substantially improved flow of fluids through the fracture will result. Accordingly, the size of the particles employed should be as large as possible and approach the width of the fracture since the larger the particles the wider the fracture will be held open. However, if the diameter of the particles is too close to the width of the fracture, there is a possibility that the particles will bridge in the fracture rather than be distributed throughout the fracture as desired. Accordingly, it is preferred that the particles employed have a diameter which is approximately one-half the predicted width of the fracture. In order to estimate the diameter of the propping agent to be employed, some knowledge of the anticipated width of the fracture should, therefore, be obtained. Field experience and laboratory experimental evidence now permit the operator to accurately estimate the anticipated width of the fracture. However, such estimation involves the application of complex mathematical formulas and is unnecessary from a practical standpoint. It has, therefore, been found that the width of a fracture can be estimated with sufficient accuracy for practical purposes by the use of the simplified formulas set forth below. These formulas assume that there is no leakoff of the viscous fracture-widening fluid and that it is only this viscous fluid which contributes to the fracture width.

For a vertical fracture:

$$w = 0.45\left(\frac{Q\mu V_T}{Eh}\right)^{1/5} \quad (A)$$

where:

$w$ = fracture width, inches
$Q$ = fluid injection rate, barrels per minute
$\mu$ = viscosity of fluid, centipoise
$V_T$ = total volume of fluid injected, gallons
$E$ = Young's modulus of the fractured formation
$h$ = height of the fracture, feet.

For a horizontal fracture:

$$w = 0.25\left(\frac{Q^2\mu^2 V_T}{E^2}\right)^{1/9} \quad (B)$$

In utilizing the above formulas, the viscosity may be determined by conventional laboratory measurements, Young's modulus varies from $1 \times 10^6$ to $13 \times 10^6$ for common underground formations and may be measured by applying standard laboratory techniques to formation specimens. However, Young's modulus may be assumed to average $5 \times 10^6$ and such assumption will not cause too large an error in the calculated width. The height of the fracture (if vertical) may generally be assumed to be equal to the thickness of the fractured formation, particularly since care is usually exercised to prevent extension of the fracture into formations (usually shale) above or below the formation of interest.

Field experience in the practice of the present invention as well as field experience in conventional fracturing techniques has established that the above formulas are sufficiently accurate to permit one to select a proper size propping agent. Also because of wide field experience which has been gained in the fracturing art, the service companies who perform fracturing operations as well as the field operators will generally have sufficiently accurate knowledge of the size of fractures generally obtained in a particular area and whether the same is vertical or horizontal. In addition, it is also possible, within certain limits, to obtain any width fracture desired and to orient a fracture in either a vertical or horizontal direction. The maximum width of the fracture which one can achieve is limited by the cost of the treatment and the hazards involved. The main hazard involved in the creation of extremely wide fractures is the possibility that the fracture will extend beyond the confines of the formation being treated. Generally, when conventional fracturing techniques are employed a fracture will be vertical in any formation located at a depth below the surface greater than about 3,000 feet and can be horizontal or vertical at shallower depths. However, there are certain techniques, such as notching the formation, selective use of particular breakdown fluids, etc., which permit one to control, to some degree, whether the fracture will be vertical or horizontal.

The propping agents which may be employed in accordance with the present invention are generally materials which do not crush into small fragments when subjected to the high pressures exerted by the walls of the fracture. Such materials should preferably be capable of supporting a load in excess of 40 pounds per particle without breaking into small fragments. One group of materials of this character are the metals, ceramics and plastics, such as aluminum, glass, etc., set forth in co-pending application, Serial No. 659,496, issued to William J. McGuire, Jr. and Loyd R. Kern on August 23, 1960, as Patent No. 2,950,247. Aside from such materials, one may also employ large-sized sand or other naturally occurring rock materials or naturally occurring organic materials such as particles of walnut shells, peach seeds, etc., so long as they exhibit sufficient strength characteristics. In addition, the particles employed in accordance with the present invention should be 0.03 inch in diameter or larger and not exceed about 0.25 inch in diameter.

Having selected the desired type and size of propping agent, it is then necessary to select a carrier fluid capable of supporting or suspending the particles for the desired length of time so that such particles may be sparsely distributed in the fracture. It has been found in accordance with the present invention that the carrier fluid employed should be such that the propping agent will have a falling rate in the carrier of less than 0.1 foot per minute. If the propping agent settles in the carrier at a higher rate, the particles will settle out in the fracture and build up a multi-layer, solid pack of particles. The falling rate of particle material in a carrier can be determined by conventional laboratory means familiar to those skilled in the art.

As pointed out above, the concentration of propping agent in its carrier fluid is also preselected in order to meet the requirements of the present method. This concentration is equal to or less than that concentration which will deposit a single layer of the propping agent in the fracture with the particles in physical contact but greater than that concentration which would permit the particles to crush into small fragments under the pressure of the fracture walls. Since in the technique described above the carrier fluid will not leakoff through the walls of the fracture, the concentration to be deposited in the fracture will be the same as the concentration of the particles in the carrier at the surface. This concentration may be expressed by the following formula.

$$C = 231 \frac{mn}{d} \quad (C)$$

where:

$C$ = concentration of propping agent in its carrier, pounds per gallon of suspension;

$m$ = mass of particles of propping agent, pounds per particle;

$n$ = number of particles per square inch of fracture face;

$d$ = diameter of particles of propping agent, inches.

The maximum concentration of particles can be determined by dividing the square of the diameter of the selected size particles into 1 to obtain $n$ (the number of particles per square inch in contact with one another) and substituting in Formula C. This maximum in many cases is greater than the concentration which presently available pumping equipment is capable of handling and, therefore, smaller concentrations may be desirable. The minimum concentration of propping agent to be employed is based upon the strength of the particles themselves. This minimum number of particles per square inch of fracture face ($n$) may be determined by dividing the pressure which will be exerted by the fracture walls by the strength of the particles in pounds per particle and again substituting in Formula C. The pressure which will be exerted by the fracture walls is generally known for a given area and will be in the range of 0.4 to 0.9 pounds per square inch per foot of depth below the surface or an average of 0.6 pounds per square inch per foot of depth. The strength of the particles may be determined by gradually applying pressure to a single particle placed between two parallel plates and observing the pressure at which the particle breaks into small fragments. An average value rather than a value for individual particles can be obtanied by similarly placing a number of particles between the parallel plates and then dividing the crushing pressure by the number of particles. In this determination, the plates employed should be harder than the particles being tested so that the particles will not embed in the plates and thus give an inaccurate measurement. When reference is made to the crushing of the large-sized propping agents into small fragments, several characteristics of the previously specified propping agents should be pointed out in order to understand the meaning of this strength limit. Some large-sized props of the character previously specified will split into large pieces when high pressures equal to the pressure of fracture walls are applied but will remain in place between the plates or the walls of the fracture in an actual field operation. Other large particles of the character described will flatten or deform to some extent under pressure. However, in either case, the props remain in place and there is no appreciable reduction in the permeability of a sparse bed of the props as a result of such splitting or flattening. On the other hand, materials which are not suitable for use in accordance with the present invention crush into small fragments which pack tightly together when fracture wall pressures are applied. Because of such fragmentation and close packing the permeability of a fracture propped with such materials is substantially lower than can be obtained in accordance with the present invention and in fact is no better than that of a multi-layer pack of props of much smaller size. Therefore, the limiting minimum strength of the large-sized props referred to herein is that load per particle at which the material will break into small fragments smaller than about 0.03 inch in diameter. As previously pointed out, it has been found that large-sized props having a strength, as defined herein, of at least 40 pounds per particles should be employed in the practice of the present invention.

The concentration of large-sized propping agent to be employed in accordance with the present invention can also be determined experimentally in the laboratory. These laboratory measurements have been carefully related to actual field experience and have been validated by such comparison. Therefore, these tests are preferred as compared with the determinations set forth above since the maximum as determined previously is often higher than available pumps will handle and the minimum does not take into consideration the fact that the particles will tend to embed in the walls of the fracture thereby resulting in a propped fracture whose effective width is less than the diameter of the particles.

The laboratory tests mentioned above may be conducted in several types of apparatus. In one instance, a cylindrical core taken from the formation to be fractured is cut into two cylinders and a hole is bored along the center axis of one-half. One-half of the core is placed in the bottom of a suitable cylindrical container adapted to prevent splitting of the core. The desired number of the selected propping particles is placed on top of this half of the core and the other half of core is placed on top of the particles. A container cover having a port which communicates with the hole in the core and adapted to slide in the container is placed on top of the second half of the core. Ports are provided in the sides of the container opposite the layer of propping particles. Pressure equal to the predicted pressure of the fracture walls is applied to the cover and a fluid is injected through the cover port, through the hole in the core, radially through the layer of propping particles and thence out the ports in the side of the container. The difference between the injection rate and the effluent rate is measured and, knowing the area of the cylinder, the conductivity of the layer is calculated by application of Darcy's law. Another form of apparatus utilizes a formation of core split longitudinally. The propping agent is placed between the two halves and the core is then placed in a rubber Hassler sleeve which, in turn, is placed in a suitable container. Pressure is applied by injecting a liquid under pressure into the annular space of the Hassler sleeve. A fluid is flowed through the layer of particles through a port in one end of the container and fluid is collected through a port in the opposite end of the container. The conductivity of the layer of propping particles is determined in the same manner as explained previously. If desired, metal plates may be employed instead of the formation samples. In such case, the metal should have approximately the same hardness as the formation to be fractured and preferably the surfaces should be roughened to simulate the faces of a formation fracture. A plurality of these tests are conducted, beginning with the particles in a single layer in physical contact with one another and then at lower concentrations. The conductivities determined may then be plotted against concentration of particles.

Having carried out the conductivity measurements set forth above, it will be found that between the maximum and the minimum concentrations specified there is a concentration which gives a maximum conductivity and is a balance between a high concentration which restricts fluid flow through the fracture and a low concentration which permits the propping agent to embed in the formation or deform excessively. By utilizing the above-described conductivity tests it has been found that the minimum conductivity or the minimum concentration of particles which can be employed in accordance with the present invention is such as will result in a conductivity of $1 \times 10^4$ millidarcy inches.

As an alternative to the measurement of conductivity, the effective width of the simulated fracture may be utilized to determine concentration. It has been found that the minimum conductivity specified above will be obtained when the final or effective fracture width is 0.006 inch. Therefore, the above tests may be carried out as previously indicated except that instead of measuring conductivity one measures the ultimate or effective width of the simulated fracture and selects a concentration of particles which gives a width of at least 0.006 inch.

It is sometimes desirable in practicing the technique previously described to utilized conventional propping sand, having a particle size below about 20-mesh ahead of the large, sparse propping agent. Such utilization of sand in conjunction with the large, sparse propping agent not only reduces the volume of large propping agent needed but offers some margin of safety if the large, sparse propping agent does not act as expected.

The introduction of sand ahead of the large, sparse propping agent may be accomplished by suspending the sand in the viscous fracture-widening fluid (the sand having a falling rate in this fluid of less than about 0.1 foot per minute). By introducing the sand in this manner, it will be carried to the furthest extremity of the fracture and concentrated there as a solid, multi-layer pack. The large, sparse propping agent will thereafter be deposited in that portion of the fracture extending from the packed sand region to the well bore. As an alternative, in cases where the fracture is vertical, the sand may be added to the latter portion of the non-penetrating spearhead or fracture-lengthening fluid. In this case, the sand will settle from the spearhead fluid and form a solid, multi-layer pack in the bottom of the fracture since its falling rate will be greater than about 0.1 foot per minute in the spearhead fluid. Then after the fracture is widened to admit the large propping agent, the large propping agent is deposited in a sparse population above the solid pack of sand.

It is also possible to carry out the present invention utilizing a modified version of the conventional fracturing method previously discussed in the introductory portion above. In such conventional operations, two fluids are employed throughout the fracture treatment. The first fluid is a penetrating liquid designed to create a fracture in the formation of interest or to lengthen an existing fracture. This fluid may be treated with leakoff control additives or the first portion may be untreated and the latter portion treated to control leakoff. Immediately following the injection of the breakdown fluid, a viscous or bodied carrier fluid containing a propping agent is injected.

At this point the procedure of the present invention departs from that of the conventional treatment. In the present method, a substantial amount of conventional size sand (below about 20-mesh) is added to the first part of the carrier fluid and deposited in the fracture prior to the deposition of a sparse population of large-sized propping agent. It is, of course, desirable that the sand be deposited in the furthest extremities of the fracture. Accordingly, the sand is deposited by means of a carrier fluid capable of supporting the sand for a long period so that the sand will be carried to the end of the fracture and will not settle near the well bore. This may be accomplished by utilizing a carrier fluid in which the falling rate of the sand is less than 0.1 foot per minute. After deposition of the sand, the selected large-sized propping agent is suspended in the same or another carrier. In this instance, the same criteria previously set forth for determining the type and size of propping agent and the concentration of propping agent in the carrier are utilized. These criteria apply in the present case the same as they do where the fracture has been previously treated to reduce leakoff of the carrier fluid since the large-sized propping agent has been preceded by a substantial amount of sand in a highly viscous carrier; and, by the time the small volume of large-sized propping agent is introduced, leakoff is again substantially zero. Therefore, leakoff of the carrier agent containing the large-sized propping agent may again be neglected and the concentration of the propping agent being pumped into the well at the surface will be the same as the concentration to be deposited in the fracture itself. Where the large-sized sparse population of propping agent is to be deposited by means of the conventional two-step procedure set forth immediately above, the volume of sand employed ahead of the large props should be greater than about 50 percent of the total volume of propping agent employed.

In the last-described technique, the breakdown fluid and the carrier fluid may be selected so that they are immiscible with one another and thereby reduce the leakoff of the carrier fluid, as previously discussed in describing the first technique of depositing sparse populations of large props.

If the conventional two-step procedure is utilized and the sand is injected in a nonviscous fluid in which case it will settle to form a solid, multi-layer pack of sand in the bottom of the fracture (the sand settles in its carrier at a rate in excess of 0.1 foot per minute), or for some other reason there is appreciable leakoff of the carrier fluid containing the large propping agent, the concentration of large-sized propping agent in the carrier at the wellhead should be varied in order to obtain an even, sparse distribution of the large-sized propping agent in the fracture. The maximum amount of large propping agent per volume of carrier at the end of the treatment may still be determined as previously indicated and will be the same as the concentration desired in the fracture. However, because of leakoff of the carrier fluid, which is at its maximum at the beginning of injection, the concentration of large propping agent in the first increment should be comparatively small and this concentration should then vary continuously from this minimum to the previously stated maximum as the deposition continues. The initial concentration of propping agent in the carrier and all later concentrations may be determined by calculating the volume of carrier which will leakoff through the walls of the fracture as a function of time. The volume leaked off can be subtracted from the volume injected up to the time in question to obtain the volume of carrier fluid in the fracture as a function of time. Such calculations are well known to those skilled in the art and one basis for calculating the same is set forth in "Optimum Fluid Characteristics for Fracture Extension," by G. C. Howard and C. R. Fast, API Drilling and Production Practices (1957), p. 261. A plot of the volume of carrier in the fracture versus time can then be prepared and the concentration of propping agent to be injected at any instant can be determined from this plot. The concentration as determined in this manner will be substantially zero for the first increment of carrier, slowly increase and thereafter increase more rapidly until the maximum concentration in the last increment of carrier is reached. Obviously, it is impractical to vary the concentration of propping agent continuously. Therefore, as a practical matter, the curve of volume of carrier in the fracture versus time can be approximated by a step function and the concentration of propping particles can be varied by introducing a series of slugs of carrier in which the concentration in each slug is constant but each successive slug contains a greater concentration than the next previous slug.

At this point it should be reiterated that the sparse population of large-sized props is preferably deposited in the fracture as close to the well bore as possible. Accordingly, an underflushing of the carrier with the large props should be practiced in all three of the techniques discussed; that is, the last few barrels of carrier with large props should be left in the well bore rather than pumped into the fracture.

Although specific examples and methods of operation have been given herein it is to be understood that modifications thereof apparent to those skilled in the art may be practiced without departing from the invention described. Accordingly, it is to be understood that the present invention is to be limited by the limitations of the appended claims and not by the specific details of this specification.

We claim:

1. In a method for increasing the permeability of a subsurface earth formation having a fracture extending from a well bore into said subsurface formation the improvement comprising injecting into the well bore and thence into said fracture a carrier fluid containing solid particles of a generally spherical propping agent having an average particle diameter between about 0.03 and 0.25 inch, said carrier fluid being capable of suspending said propping agent so that said propping agent will settle at a rate of less than 0.1 foot per minute through said carrier fluid and the concentration of said propping agent in said carrier fluid being equal to $$C = 231 \frac{mn}{d}$$

where C is the concentration of said propping agent in pounds per gallon of suspension, $m$ is the average mass per particle of said propping agent in pounds, $d$ is the average particle diameter of said propping agent in inches, and $n$ is a selected number of particles of said propping agent per square inch of fracture face between $$n = \frac{1}{d^2}$$

and $$n = \frac{p}{s}$$

where $p$ is the pressure of the fracture walls in pounds per square inch and $s$ is the average load in pounds at which individual particles of said propping agent will crush into small fragments and discontinuing injecting of said carrier fluid containing said propping agent before the last increment of said carrier fluid and said propping agent reaches a point in the well bore opposite the top of said fracture.

2. A method in accordance with claim 1 wherein the diameter of the propping agent is equal to about one-half of the width of the fracture.

3. A method in accordance with claim 1 wherein the propping agent is metallic.

4. A method in accordance with claim 3 wherein the propping agent is aluminum.

5. A method in accordance with claim 1 wherein the propping agent is ceramic.

6. A method in accordance with claim 1 wherein the propping agent is plastic.

7. A method in accordance with claim 1 wherein the propping agent is an organic material.

8. In a method for increasing the permeability of a subsurface earth formation having a fracture extending from a well bore into said subsurface formation the improvement comprising injecting into said well bore and thence into said fracture a carrier fluid containing generally spherical particles of sand having an average diameter less than about 0.03 inch and thereafter injecting into said well bore and thence into said fracture a carrier fluid containing solid particles of a generally spherical propping agent having an average particle diameter between about 0.03 and 0.25 inch, said carrier fluid being capable of suspending said propping agent so that said propping agent will settle at a rate of less than 0.1 foot per minute through said carrier fluid and the concentration of said propping agent in said carrier fluid being equal to $$C = 231 \frac{mn}{d}$$

where C is the concentration of said propping agent in pounds per gallon of suspension, $m$ is the average mass per particle of said propping agent in pounds, $d$ is the average particle diameter of said propping agent in inches, and $n$ is a selected number of particles of said propping agent per square inch of fracture face between $$n = \frac{1}{d^2}$$

and $$n = \frac{p}{s}$$

where $p$ is the pressure of the fracture walls in pounds per square inch and $s$ is the average load in pounds at which individual particles of said propping agent will crush into small fragments and discontinuing injecting of said carrier fluid containing said propping agent before the last increment of said carrier fluid and said propping agent reaches a point in the well bore opposite the top of said fracture.

9. In a method for increasing the permeability of a subsurface earth formation having a fracture extending from a well bore into said formation the improvement comprising injecting into said well bore and thence into said fracture a nonpenetrating fluid containing a leakoff control agent adapted to lengthen said fracture and plug the walls of said fracture and prevent filtration of fluids through the walls of said fracture, injecting into said well bore and thence into said fracture a viscous fluid adapted to increase the width of said fracture and thereafter injecting into said fracture a carrier fluid containing solid particles of a generally spherical propping agent having an average particle diameter between about 0.03 and 0.25 inch, said carrier fluid being capable of suspending said propping agent so that said propping agent will settle at a rate of less than 0.1 foot per minute through said carrier fluid and the concentration of said propping agent in said carrier fluid being equal to $$C = \frac{mn}{d}$$

where $C$ is the concentration of said propping agent in pounds per gallon of suspension, $m$ is the average mass per particle of said propping agent in pounds, $d$ is the average particle diameter of said propping agent in inches, and $n$ is a selected number of particles of said propping agent per square inch of fracture face between $$n = \frac{1}{d^2}$$

and $$n = \frac{p}{s}$$

where $p$ is the pressure of the fracture walls in pounds per square inch and $s$ is the average load in pounds at which individual particles of said propping agent will crush into small fragments and discontinuing injecting of said carrier fluid containing said propping agent before the last increment of said carrier fluid and said propping agent reaches a point in the well bore opposite the top of said fracture.

10. A method in accordance with claim 9 wherein generally spherical particles of sand having an average particle diameter less than about 0.03 inch are added to the viscous, fracture-widening fluid injected.

11. A method in accordance with claim 9 wherein generally spherical particles of sand having an average particle diameter less than about 0.03 inch are added to the last portion of the nonpenetrating, fracture-lengthening fluid.

12. In a method for increasing the permeability of a subsurface earth formation having a fracture extending from a well bore into said subsurface formation the improvement comprising injecting into the well bore and thence into said fracture a carrier fluid containing solid particles of a generally spherical propping agent having an average particle diameter between about 0.03 and 0.25 inch, said carrier fluid being capable of suspending said propping agent so that said propping agent will settle at a rate of less than 0.1 foot per minute through said carrier fluid and the concentration of said propping agent in said carrier fluid being equal to $$C = 231 \frac{mn}{d}$$

where $C$ is the concentration of said propping agent in pounds per gallon of suspension, $m$ is the average mass per particle of said propping agent in pounds, $d$ is the average particle diameter of said propping agent in inches, and $n$ is a selected number of particles of said propping agent per square inch of fracture face less than $$n = \frac{1}{d^2}$$

and discontinuing injecting of said carrier fluid containing said propping agent before the last increment of said carrier fluid and said propping agent reaches a point in the well bore opposite the top of said fracture.

13. A method in accordance with claim 12 wherein the concentration of propping agent is varied from a small concentration for the first increment of carrier fluid containing said propping agent to the maximum concentration specified for the last increment of said carrier fluid containing said propping agent.

References Cited in the file of this patent

UNITED STATES PATENTS

| | | |
|---|---|---|
| 2,774,431 | Sherborne | Dec. 18, 1956 |
| 2,859,819 | Trott | Nov. 11, 1958 |
| 2,962,095 | Morse | Nov. 29, 1960 |